United States Patent
Takahashi et al.

(10) Patent No.: US 8,425,032 B2
(45) Date of Patent: Apr. 23, 2013

(54) SPECTACLE LENS

(75) Inventors: Naoshi Takahashi, Chiyoda-ku (JP); Tomomitsu Onizawa, Chiyoda-ku (JP); Shinichi Sato, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 259 days.

(21) Appl. No.: 12/994,797

(22) PCT Filed: May 21, 2009

(86) PCT No.: PCT/JP2009/059734
§ 371 (c)(1),
(2), (4) Date: Nov. 26, 2010

(87) PCT Pub. No.: WO2009/145241
PCT Pub. Date: Dec. 3, 2009

(65) Prior Publication Data
US 2011/0128494 A1    Jun. 2, 2011

(30) Foreign Application Priority Data
May 28, 2008   (JP) .................. 2008-139257

(51) Int. Cl.
*G02C 7/02* (2006.01)
(52) U.S. Cl.
USPC ............. 351/159; 524/91; 524/147; 524/313; 524/318
(58) Field of Classification Search .................. 351/159; 524/91, 313, 318, 147
See application file for complete search history.

(56) References Cited

U.S. PATENT DOCUMENTS

| | | | | |
|---|---|---|---|---|
| 7,863,354 B2 * | 1/2011 | Tanabe et al. | ................... | 524/91 |
| 2003/0055200 A1 * | 3/2003 | Ando et al. | ................... | 528/196 |
| 2007/0155867 A1 * | 7/2007 | Ikari et al. | ................... | 524/91 |
| 2007/0228587 A1 | 10/2007 | Ikari | | |
| 2007/0299168 A1 | 12/2007 | Ariki et al. | | |

FOREIGN PATENT DOCUMENTS

| | | |
|---|---|---|
| CA | 2 374 445 | 12/2000 |
| JP | 10-168296 | 6/1998 |
| JP | 2001-288289 | 10/2001 |
| JP | 2003-501506 | 1/2003 |
| JP | 2005-042003 | 2/2005 |
| JP | 2006-154783 | 6/2006 |
| JP | 2007-016069 | 1/2007 |
| WO | 2005/116138 | 12/2005 |
| WO | WO 2008/069336 * | 6/2008 |

OTHER PUBLICATIONS

International Search Report issued Aug. 18, 2009 in corresponding International (PCT) Application No. PCT/JP2009/059734, of record.
International Preliminary Report on Patentability with English translation of the Written Opinion issued Jan. 11, 2011 in corresponding International Application No. PCT/JP2009/059734.

* cited by examiner

*Primary Examiner* — Peter Szekely
(74) *Attorney, Agent, or Firm* — Wenderoth, Lind & Ponack, L.L.P.

(57) ABSTRACT

This invention provides a spectacle lens excellent in hue, and provides a spectacle lens formed from a resin composition containing
(1) 100 parts by weight of a polycarbonate resin,
(2) 0.05 to 0.5 part by weight of a fatty acid ester mold release agent that is at least one member selected from the group consisting of (i) an ester of a monohydric alcohol having 1 to 20 carbon atoms and a saturated or unsaturated fatty acid having 10 to 30 carbon atoms and (ii) a full ester of glycerin and a saturated or unsaturated fatty acid having 10 to 30 carbon atoms, and that has a metal potassium content of 15 ppm or less and a metal sodium content of 30 ppm or less,
(3) 0.1 to 0.25 part by weight of a benzotriazole ultraviolet absorbent,
(4) 0.1 to 0.3 part by weight of a hindered phenol antioxidant, and
(5) 0.005 to 0.1 part by weight of a phosphorus heat stabilizer, and a process for the production thereof.

8 Claims, No Drawings

SPECTACLE LENS

TECHNICAL FIELD

This invention relates to a spectacle lens formed from a resin composition that is excellent in transparency and molding-heat resistance, that has high reproducibility and exhibits little yellowing even if it has a thermal history and that is excellent in hue. More specifically, this invention relates to a spectacle lens formed from a resin composition containing a mold release agent having a specific-metal content of a certain level or less.

BACKGROUND ART

A polycarbonate resin has high refractivity and is excellent in transparency and impact resistance, and it is widely used as a lens material, above all, as a spectacle lens material. A spectacle lens formed of a polycarbonate resin has a small thickness and a light weight and has high impact strength and safety as compared with any conventional glass lens or such a plastic lens as is shown in Patent Document 1. It has hence come to be used for eyesight-correcting lens, dark glasses, protective glasses, etc.

When product scraps from a sprue portion, a runner portion and a gate portion are recycled in injection-molding a polycarbonate resin, there is a problem that a spectacle lens itself is deteriorated in hue (yellowing) due to the thermal history of the product scraps. Further, there is another problem that the hue of a spectacle lens is liable to be deteriorated due to a thermal history during molding. As a molding material for spectacle lenses, there is therefore demanded a polycarbonate resin having reproducibility, molding-heat resistance and thermal stability in high-temperature molding at 350° C. or higher.

Patent Document 2 discloses a spectacle lens formed of a resin composition prepared by incorporating a specific ultraviolet absorbent and mold release agent into a polycarbonate resin. However, its molding-heat resistance and reproducibility are not sufficient.

Patent Document 3 discloses a polycarbonate resin composition excellent in releasability from a mold and hydrolyzability, which contains a mold release agent having a pentaerythritol structure and having a specific-metal-component content of a specific value or less. However, its molding-heat resistance and reproducibility as a spectacle lens are not sufficient.

(Patent Document 1) JP-A 2001-288289
(Patent Document 2) JP-A 2006-154783
(Patent Document 3) JP-A 2005-42003

DISCLOSURE OF THE INVENTION

It is an object of this invention to provide a spectacle lens excellent in hue. It is another object of this invention to provide a spectacle lens reclaiming a product scrap and being excellent in hue. It is still another object of this invention to provide a process for producing a spectacle lens excellent in hue, in which the yellowing of a molding material caused by a thermal history during molding is inhibited. It is yet another object of this invention to provide a process for producing a spectacle lens excellent in hue in which the yellowing of a molding material caused by reclaiming a product scrap, etc., is inhibited.

For achieving the above objects, the present inventors have made diligent studies on mold release agents, thermal stabilizers and ultraviolet absorbents that are used in a polycarbonate resin, and as a result, it has been found that the use of a specific fatty acid ester mold release agent having potassium metal and sodium metal contents of certain levels or less and the use of a phosphorus-containing stabilizer improve on a color difference by a heat during molding without impairing moldability or impairing the transparency of a lens. And, they have accordingly arrived at this invention.

In this invention, the molding-heat resistance means that a molding material suffers a yellowing to less degree even when it is exposed to a state of its being held at a high temperature for a long period of time during the production of a lens by molding such as extrusion compression molding, etc. Further, "reproducibility" means that a molding material suffers a color difference to less degree even if a thermal history is added by reclaiming a product scrap, etc.

That is, this invention includes the following inventions.
1. A spectacle lens formed from a resin composition containing
  (1) 100 parts by weight of a polycarbonate resin,
  (2) 0.05 to 0.5 part by weight of a fatty acid ester mold release agent that is at least one member selected from the group consisting of (i) an ester of a monohydric alcohol having 1 to 20 carbon atoms and a saturated or unsaturated fatty acid having 10 to 30 carbon atoms and (ii) a full ester of glycerin and a saturated or unsaturated fatty acid having 10 to 30 carbon atoms, and that has a metal potassium content of 15 ppm or less and a metal sodium content of 30 ppm or less,
  (3) 0.1 to 0.25 part by weight of a benzotriazole ultraviolet absorbent,
  (4) 0.1 to 0.3 part by weight of a hindered phenol antioxidant, and
  (5) 0.005 to 0.1 part by weight of a phosphorus heat stabilizer.
2. A spectacle lens recited in the above item 1, wherein the fatty acid ester mold release agent is a mixture of (i) an ester of a monohydric alcohol having 1 to 20 carbon atoms and a saturated fatty acid having 10 to 30 carbon atoms with (ii) a full ester of glycerin and a saturated fatty acid having 10 to 30 carbon atoms.
3. A spectacle lens recited in the above item 1, wherein the benzotriazole ultraviolet absorbent is 2-(2'-hydroxy-5'-tert-octylphenyl)benzotriazole.
4. A spectacle lens recited in the above item 1, wherein the benzotriazole ultraviolet absorbent is 2,2'-methylenebis[4-(1,1,3,3-tetramethylbutyl)-6-(2H-benzotriazol-2-yl)phenol].
5. A spectacle lens recited in the above item 1, wherein the hindered phenol antioxidant is a hindered phenol antioxidant having a pentaerythritol structure.
6. A spectacle lens recited in the above item 1, wherein the phosphorus heat stabilizer has 2,4-di-tert-butylphenyl structure.
7. A spectacle lens recited in the above item 1, wherein pellets of the polycarbonate resin composition have a color difference ($\Delta E$) of 2.5 or less, the pellets being obtained by molding said polycarbonate resin composition with a twin-screw extruder to obtain pellets and extrusion-remolding the pellets again with a single-screw extruder, $$\Delta E = \{(\Delta L)^2 + (\Delta a)^2 + (\Delta b)^2\}^{1/2}$$

Hue of pellets (virgin pellets) obtained by molding with the twin-screw extruder: L,a,b
Hue of pellets (re-pellets) obtained by remolding with the single-screw extruder: L',a',b'
$\Delta L$: L-L'
$\Delta a$: a-a'
$\Delta b$: b-b'.

8. A process for producing a spectacle lens, which comprises molding a resin composition containing (1) 100 parts by weight of a polycarbonate resin, (2) 0.05 to 0.5 part by weight of a fatty acid ester mold release agent that is at least one member selected from the group consisting of (i) an ester of a monohydric alcohol having 1 to 20 carbon atoms and a saturated or unsaturated fatty acid having 10 to 30 carbon atoms and (ii) a full ester of glycerin and a saturated or unsaturated fatty acid having 10 to 30 carbon atoms, and that has a metal potassium content of 15 ppm or less and a metal sodium content of 30 ppm or less, (3) 0.1 to 0.25 part by weight of a benzotriazole ultraviolet absorbent, (4) 0.1 to 0.3 part by weight of a hindered phenol antioxidant, and (5) 0.005 to 0.1 part by weight of a phosphorus heat stabilizer.

PREFERRED EMBODIMENT OF THE INVENTION

The present invention will be explained in detail hereinafter.

(Polycarbonate Resin)

The polycarbonate resin for use in this invention is an aromatic polycarbonate resin obtained by reacting a dihydric phenol with a carbonate precursor. Specific examples of the above dihydric phenol include bis(hydroxyaryl)alkanes such as 2,2-bis(4-hydroxyphenyl)propane (generally called bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenyl methane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane;

bis(hydroxyphenyl)cycloalkanes such as 1,1-bis(hydroxyphenyl)cyclopentane and 1,1-bis(hydroxyphenyl)cyclohexane;

dihydroxyaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide;

dihydroxydiaryl sulfoxides such as 4,4'-dihydroxydiphenyl sulfoxide and 4,4'-dihydroxy-3,3'-dimethyldiphenyl sulfoxide;

dihydroxydiaryl sulfones such as 4,4'-dihydroxydiphenyl sulfone and 4,4'-dihydroxy-3,3'-dimethyldiphenyl sulfone. These dihydric phenols may be used singly or in combination of two or more of them.

Of the above dihydric phenols, it is preferred to use 2,2-bis(4-hydroxyphenyl)propane (bisphenol A) as a main dihydric phenol component, and it is preferred to use bisphenol A in an amount of 70 mol % or more, in particular 80 mol % or more, based on the total of dihydric phenol components. The most preferred is an aromatic polycarbonate resin of which the dihydric phenol component is substantially bisphenol A.

Basic means for producing the polycarbonate resin will be briefly explained. In a solution method using phosgene as a carbonate precursor, normally, there is carried out a reaction between a dihydric phenol component and phosgene in the presence of an acid binder and an organic solvent. The acid binder is selected, for example, from hydroxides of alkali metals such as sodium hydroxide, potassium hydroxide, etc., or amine compounds such as pyridine. The organic solvent is selected, for example, from halogenated hydrocarbons such as methylene chloride, chlorobenzene, etc. For promoting the reaction, for example, a catalyst such as tertiary amine, quaternary ammonium salt, etc., can be used. As a molecular weight adjuster, it is desirable to use, for example, a terminal stopper such as a phenol or an alkyl-substituted phenol, like p-tert-butylphenol. The reaction temperature is normally 0 to 40° C., the reaction time period is several minutes to 5 hours, and it is preferred to maintain a pH during the reaction at 10 or more.

An ester exchange method (melting method) using carbonate diester as a carbonate precursor is a method in which predetermined amounts of a dihydric phenol component and carbonate diester are stirred under heating in the presence of an inert gas, and an alcohol or phenols generated are distilled off. Although differing depending upon the boiling point, etc., of the generated alcohol or phenols, the reaction temperature is normally in the range of 120 to 350° C. The reaction is carried out under reduced pressure from its initial stage while distilling off the generated alcohol or phenols. For promoting the reaction, further, a general ester exchange reaction catalyst can be used. Examples of the carbonate diester for use in this ester exchange reaction include diphenyl carbonate, dinaphthyl carbonate, dimethyl carbonate, diethyl carbonate, dibutyl carbonate, etc., and in particular, diphenyl carbonate is preferred.

The molecular weight of the polycarbonate resin for use in this invention as a viscosity average molecular weight is preferably 17,000 to 30,000, particularly preferably 20,000 to 26,000. Since the spectacle lens is a precision-molded article, it is important to impart it with a defined curvature and a defined lens power by accurately transferring a form of mirror surface of a mold. Therefore, a low-viscosity polycarbonate resin having good melt flowability is desirable. When the viscosity thereof is too low, however, there cannot be held the impact strength that is a feature of the polycarbonate resin. The above viscosity average molecular weight (M) of a polycarbonate resin is determined by substituting a specific gravity ($\eta_{sp}$) determined from a solution of 0.7 g of the polycarbonate resin in 100 ml of methylene chloride at 20° C. using Ostwald Viscometer in the following expression.

$\eta_{sp}/c = [\eta] + 0.45 \times [\eta]^2 c$ (wherein $[\eta]$ is an intrinsic viscosity)

$[\eta] = 1.23 \times 10^{-4} M^{0.83}$ $c = 0.7$ (Fatty Acid Ester Mold Release Agent)

The resin composition of this invention contains a fatty acid ester mold release agent for improving the releasability of a spectacle lens from a mold in melt-molding.

The fatty acid ester mold release agent is at least one member selected from (i) an ester of a monohydric alcohol having 1 to 20 carbon atoms and a saturated or unsaturated fatty acid having 10 to 30 carbon atoms and (ii) a full ester of glycerin and a saturated or unsaturated fatty acid having 10 to 30 carbon atoms.

(i) The ester of a monohydric alcohol having 1 to 20 carbon atoms and a saturated or unsaturated fatty acid having 10 to 30 carbon atoms includes stearyl stearate, palmityl palmitate, butyl stearate, methyl laurate, isopropyl palmitate, etc., and of these, stearyl stearate is preferred.

(ii) The full ester of glycerin and a saturated or unsaturated fatty acid having 10 to 30 carbon atoms includes glycerin tristearate, glycerin behenate, glycerin trisorbate, etc.

These mold release agents are used singly or in combination of two or more of them. Preferred is a mixture of (i) an ester of a monohydric alcohol having 1 to 20 carbon atoms and a saturated fatty acid having 10 to 30 carbon atoms with (ii) a full ester of glycerin and a saturated fatty acid having 10 to 30 carbon atoms. The mixing weight ratio (the former/the latter) is preferably 45-15/55-85, more preferably 40-15/60-85.

Of the fatty acid esters, glycerin tristearate or a mixture of glycerin tristearate with stearyl stearate is preferably used. In particular, a mixture of glycerin tristearate with stearyl stearate is preferably used. The mixing weight ratio (the former/the latter) is preferably 45-15/55-85, more preferably 40-15/60-85.

The content of the mold release agent per 100 parts by weight of the polycarbonate resin is 0.05 to 0.5 part by weight, preferably 0.08 to 0.4 part by weight, more preferably 0.1 to 0.3 part by weight. When the content of the mold release agent is smaller than 0.05 part by weight, no excellent mold releasability can be obtained. When it exceeds 0.5 part by weight, the discoloration of a spectacle lens is aggravated.

The mold release agent can be used in combination with other mold release agent known to one skilled in the art. However, when the fatty acid ester mold release agent is used in combination with other, preferably, the content thereof should be 0.05 to 0.5 part by weight, and it is a main component of the mold release agent.

With regard to the fatty acid ester mold release agent, the content of metal potassium in the mold release agent is 15 ppm or less, preferably 12 ppm or less, more preferably 10 ppm or less.

Further, the content of metal sodium in the mold release agent is 30 ppm or less, preferably 25 ppm or less, more preferably 20 ppm or less. When the content of each metal element in the above mixture is large, it incurs a poor hue of a molded product.

The metal potassium and sodium in the fatty acid ester mold release agent are remained as an impurity when the mold release agent is produced. These are mainly derived from an impurity in production raw materials, a catalyst for producing the mold release agent, etc., and can be removed by purification, etc. The metal potassium and sodium in the mold release agent can be analyzed by decomposing the mold release agent with a solution mixture of sulfuric acid with nitric acid, dissolving a residue in hydrochloric acid and subjecting the resultant solution to an apparatus for inductively coupled plasma-mass spectrometry (ICP-MS).

(Benzotriazole Ultraviolet Absorbent)

The resin composition of this invention contains a benzotriazole ultraviolet absorbent. The benzotriazole ultraviolet absorbent is an ultraviolet absorbent having a benzotriazole structure. The benzotriazole ultraviolet absorbent includes 2-(2'-hydroxy-5'-methylphenyl)benzotriazole, 2-(2'-hydroxy-5'-tert-octylphenyl)benzotriazole, 2-(2'-hydroxy-3',5'-dicumulphenyl)phenylbenzotriazole, 2-(2'-hydroxy-3'-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2-(2'-hydroxy-5'-tert-butylphenyl)benzotriazole, 2-(2'-hydroxy-4'-octoxyphenyl)benzotriazole, 2,2'-methylenebis(4-cumyl-6-benzotriazolephenyl), 2,2'-p-phenylenebis(1,3-benzooxazin-4-one) and 2-[2-hydroxy-3-(3,4,5,6-tetrahydrophthalimidemethyl)-5-methylphenyl]benzotriazole. These may be used singly or as a mixture of two or more of them.

The benzotriazole ultraviolet absorbent is preferably selected from 2-(2'-hydroxy-5'-methylphenyl)benzotriazole, 2-(2'-hydroxy-5'-tert-octylphenyl)benzotriazole, 2-(2'-hydroxy-3',5'-dicumylphenyl)phenylbenzotriazole, 2-(2'-hydroxy-3'-tert-butyl-5'-methylphenyl)-5-chlorobenzotriazole, 2,2'-methylenebis[4-(1,1,3,3-tetramethylbutyl)-6-(2H-benzotriazol-2-yl)phenol] and 2-[2-hydroxy-3-(3,4,5,6-tetrahydrophthalimidemethyl)-5-methylphenyl]benzotriazole. The benzotriazole ultraviolet absorbent is more preferably selected from 2-(2'-hydroxy-5'-tert-octylphenyl)benzotriazole and 2,2-methylenebis[4-(1,1,3,3-tetramethylbutyl)-6-(2H-benzotriazol-2-yl)phenol].

In the resin composition of this invention, the content of the benzotriazole ultraviolet absorbent per 100 parts by weight of the polycarbonate resin is 0.10 to 0.25 part by weight, preferably 0.12 to 0.23 part by weight, more preferably 0.15 to 0.20 part by weight. When the content of the benzotriazole ultraviolet absorbent exceeds 0.25 part by weight, the ultraviolet absorbent sublimates during molding, the cloudiness (haze) of a spectacle lens increases and the hue is deteriorated. Further, when the content of the benzotriazole ultraviolet absorbent is less than 0.10 part by weight, the ultraviolet absorbing capability is insufficient.

The resin composition of this invention may contain a benzophenone ultraviolet absorbent, a triazine ultraviolet absorbent, a cyclic imino ester ultraviolet absorbent, a cyanoacrylate ultraviolet absorbent, etc., in addition to the benzotriazole ultraviolet absorbent so long as the properties of the resin composition will not be impaired.

(Hindered Phenol Antioxidant)

The resin composition of this invention contains a hindered phenol antioxidant. The hindered phenol antioxidant includes triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzenesulfonate-diethyl ester, tris(3,5-di-tert-butyl-4-hydroxybenzyl)isocyanurate, 3,9-bis{1,1-dimethyl-2-[β-(3-tert-butyl-4-hydroxy-5-methylphenyl)propionyloxy]ethyl}-2,4,8,10-tetraoxaspiro(5,5)undecane, etc. These can be used singly or in combination of two or more of them. Of these, a hindered phenol antioxidant having a pentaerythritol structure is preferred. In particular, pentaerythritol-tetrakis[3-(3,5-di-tert-butyl-4-hydroxyphenyl)propionate] is preferred.

The content of the hindered phenol antioxidant per 100 parts by weight of the polycarbonate resin is 0.1 to 0.3 part by weight, preferably 0.1 to 0.25 part by weight, more preferably 0.1 to 0.2 part by weight.

(Phosphorus Heat Stabilizer)

The resin composition of this invention contains a phosphorus heat stabilizer. The phosphorus heat stabilizer includes phosphorous acid, phosphoric acid, phosphonous acid, phosphonic acid and esters of these. Specifically, it includes triphenyl phosphite, tris(nonylphenyl)phosphite, tris(2,4-di-tert-butylphenyl)phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, etc. These may be used singly or in combination of two or more of them. Of these, a phosphorus heat stabilizer having a 2,4-di-tert-butylphenyl structure is preferred.

As a phosphorus heat stabilizer, tris(2,4-di-tert-butylphenyl)phosphite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite are preferred. In particular, tetrakis(2,4-di-tert-butylphenyl)-4,4'-biphenylene diphosphonite is preferred.

The content of the phosphorus heat stabilizer per 100 parts by weight of the polycarbonate resin is 0.005 to 0.1 part by weight, preferably 0.008 to 0.08 part by weight, more preferably 0.01 to 0.05 part by weight.

(Bluing Agent)

The resin composition of this invention may contain a bluing agent for offsetting a yellow tint that the polycarbonate resin and an ultraviolet absorbent bring about on a lens when it is molded into a spectacle lens. Any bluing agent can be used without any difficulty so long as it can be used in polycarbonate resins. Generally, an anthraquinone dye is preferred since it is easily available.

Specifically, typical examples of the bluing agent include generic name Solvent Violet 13 [CA. No. (Color Index No.) 60725: trade names "MACROLEX Violet B" supplied by Bayer AG, "DAIRESIN Blue G" supplied by Mitsubishi Chemical Corporation, and "SUMIPLAST Violet B" supplied by Sumitomo Chemical Co., Ltd.], generic name Solvent Violet 31 [CA. No. 68210; trade name "DIARESIN Violet D" supplied by Mitsubishi Chemical Corporation"], generic name Solvent Violet 33 [CA. No. 60725: trade name "DIARESIN blue J" supplied by Mitsubishi Chemical Corporation"], generic name Solvent Blue 94 [CA. No. 61500: trade name "DIARESIN blue N" supplied by Mitsubishi Chemical Corporation"], generic name Solvent Violet 36 [CA. No. 68210: trade name "MACROLEX Violet 3R" supplied by Bayer AG], generic name Solvent Blue 97 [ trade name "MACROLEX blue RR" supplied by Bayer AG] and generic name Solvent Blue 45 [CA. No. 61110: trade name "Tetrazole blue RLS" supplied by Sandoz AG]. The above bluing agent is incorporated into the polycarbonate resin generally in a concentration of 0.3 to 1.2 ppm. When too much bluing agent is incorporated, the absorption by the bluing agent is intensified, the luminous transmittance is decreased, and a dull lens is formed. In particular, when it is a spectacle lens for eyesight correction, it has a thick portion and a thin portion, and the thickness of the lens changes greatly, so that when the absorption by the bluing agent is intensified, a hue difference between the central portion and the circumferential portion of the lens occurs, and a lens having a very poor appearance is obtained.

(Others)

The resin composition of this invention may contain other heat stabilizer, an antistatic agent, a flame retardant, a heat ray blocker, a fluorescent brightener, a pigment, a light diffusing agent, a reinforcement filler, other resin, an elastomer, etc., so long as they shall not impair the objects of this invention.

A sulfur heat stabilizer is selected from pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, distearyl-3,3'-thiodipropionate, etc. Of these, pentaerythritol-tetrakis(3-laurylthiopropionate), pentaerythritol-tetrakis(3-myristylthiopropionate), dilauryl-3,3'-thiodipropionate and dimyristyl-3,3'-thiodipropionate are preferred. In particular, pentaerythritol-tetrakis(3-laurylthiopropionate) is preferred. As the above thioether compounds are commercially supplied as Sumilizer TP-D (trade name) and Sumilizer TMP (trade name) by Sumitomo Chemical Co., Ltd., they are easily available.

The content of the sulfur heat stabilizer in the resin composition per 100 parts by weight of the polycarbonate resin is preferably 0.001 to 0.2 part by weight.

In the resin composition used for a molding material for the spectacle lens of this invention, preferably, the color difference ($\Delta E$) of its pellets between one obtained by molding the resin composition with a twin-screw extruder and the other obtained by further extrusion-remolding with a single-screw extruder is 2.5 or less. The hue (L,a,b) values of the pellets of the above two types are measured by an illuminant C reflection method according to JIS K-7105, and the color difference ($\Delta E$) is determined by the following expression.

$$\Delta E = \{(\Delta L)^2 + (\Delta a)^2 + (\Delta b)^2\}^{1/2}$$

Hue of pellets (virgin pellets) obtained by molding with the twin-screw extruder: L,a,b:

Hue of pellets (re-pellets) obtained by remolding with the single-screw extruder: L',a',b'

$\Delta L$: L-L'

$\Delta a$: a-a'

$\Delta b$: b-b'.

In the resin composition that is used for a molding material for the spectacle lens of this invention, preferably, the color difference ($\Delta E$) of molded plates between one obtained by injection-molding said resin composition and the other obtained after residing, is 0.3 or less. The hue (L,a,b) values of the above two molded plates are measured by an illuminant C reflection method according to JIS K-7105, and the color difference ($\Delta E'$) is determined by the following expression.

$$\Delta E' = \{(\Delta L')^2 + (\Delta a')^2 + (\Delta b')^2\}^{1/2}$$

Hue of "molded plate before residing": L",a",b"

Hue of "molded plate after residing": L'",a'",b'"

$\Delta L'$: L"-L'"

$\Delta a'$: a"-a'"

$\Delta b'$: b"-b'"

(Spectacle Lens)

The spectacle lens of this invention includes a finish lens of which the convex and concave surfaces are both optically completed by transfer of forms of glass mold surfaces in molding and which is formed so as to agree with a desired lens power. It also includes a semi-finish lens of which the convex surface alone is optically completed like the finish lens and of which the concave surface is optically completed later so as to agree with a desired lens power according to a received order, etc. The semi-finish lens is cut or ground with a curve generator or an NC-controlled cutting tool, etc., so as to agree with a necessary concave surface processing, and smoothening-treatment (fining) is applied thereto as required. This cut or ground, smoothened (fined) surface is polished with a polishing dish with an intervening an abrasive or abrasive cloth, a polishing tool having flexibility, etc., to complete a mirror-surface optical lens. Then, the finish lens and the polished semi-finish lens are both washed, and examined for damage, foreign matter, etc. Further, they go through the dying step of dying a lens in a color as required, the hard-coating step of forming a hard coating for covering a plastic lens from being easily scratched, the film-forming step of forming an antireflection film for decreasing the surface reflection of a lens to improve its transmittance, etc., and they are shipped as complete products and used by users.

(Process for Producing Spectacle Lens)

This invention includes a process for producing a spectacle lens, which comprises molding a resin composition containing (1) 100 parts by weight of a polycarbonate resin, (2) 0.05 to 0.5 part by weight of a fatty acid ester mold release agent that is at least one member selected from the group consisting of (i) an ester of a monohydric alcohol having 1 to 20 carbon atoms and a saturated or unsaturated fatty acid having 10 to 30 carbon atoms and (ii) a full ester of glycerin and a saturated or unsaturated fatty acid having 10 to 30 carbon atoms, and that has a metal potassium content of 15 ppm or less and a metal sodium content of 30 ppm or less, (3) 0.1 to 0.25 part by weight of a benzotriazole ultraviolet absorbent, (4) 0.1 to 0.3 part by weight of a hindered phenol antioxidant, and (5) 0.005 to 0.1 part by weight of a phosphorus heat stabilizer.

The mold method includes an extrusion compression molding method, an injection compression molding method, an injection extrusion molding method, an injection press-molding method, etc.

(Process Using Resin Composition as Molding Material for Spectacle Lens)

This invention includes a process that uses, as a molding material for a spectacle lens, a resin composition containing (1) 100 parts by weight of a polycarbonate resin, (2) 0.05 to 0.5 part by weight of a fatty acid ester mold release agent that is at least one member selected from the group consisting of (i) an ester of a monohydric alcohol having 1 to 20 carbon atoms and a saturated or unsaturated fatty acid having 10 to 30 carbon atoms and (ii) a full ester of glycerin and a saturated or unsaturated fatty acid having 10 to 30 carbon atoms, and that has a metal potassium content of 15 ppm or less and a metal sodium content of 30 ppm or less, (3) 0.1 to 0.25 part by weight of a benzotriazole ultraviolet absorbent, (4) 0.1 to 0.3 part by weight of a hindered phenol antioxidant, and (5) 0.005 to 0.1 part by weight of a phosphorus heat stabilizer.

EXAMPLES

This invention will be explained further in detail with reference to Examples below. "Part" stands for "part by weight", and evaluations were practiced according to the following methods.

(1) Elemental Analysis of a Trace of Metals:

Metal potassium and sodium in a mold release agent were analyzed by decomposing a mold release agent with a solution mixture of sulfuric acid with nitric acid, dissolving a residue in hydrochloric acid and subjecting the resultant solution to an apparatus for inductively coupled plasma-mass spectroscopy (ICP-MS). The analysis was carried out with an analyzer ICPM-8500 supplied by Shimadzu Corporation.

(2) Evaluation of Hue (Reproducibility):

Virgin pellets and re-pellets obtained in each Example were measured for hues (L,a,b) with SE-2000 supplied by Nippon Denshoku Industries Co., Ltd. by an illuminant C reflection method according to JIS K-7105, and a color difference $\Delta E$ was determined on the basis of the following expression. $\Delta E$ shows that reproducibility is superior with a decrease in its value.

$$\Delta E = \{(\Delta L)^2 + (\Delta a)^2 + (\Delta b)^2\}^{1/2}$$

Hue of "virgin pellets": L,a,b
Hue of "re-pellets": L',a',b'
$\Delta L$: L-L'
$\Delta a$: a-a'
$\Delta b$: b-b'.

(3) Evaluation of Molding-Heat Resistance

Plates having a thickness of 2 mm were formed from virgin pellets obtained in Examples with an injection-molding machine J85-ELIII supplied by the Japan Steel Works, Ltd. at a cylinder temperature of 370° C. at a mold temperature of 80° C. for 1 minute as one cycle. They were continuously formed for 20 shots, and then a resin was caused to reside in the cylinder of the above injection-molding machine for 10 minutes. After the residing, plates having a thickness of 2 mm each were formed.

The plates before and after the residing were measured for hues (L,a,b) with SE-2000 supplied by Nippon Denshoku Industries Co., Ltd. by an illuminant C reflection method according to JIS K-7105, and a color difference $\Delta E'$ was determined on the basis of the following expression. $\Delta E'$ shows that molding-heat resistance was superior with a decrease in its value.

$$\Delta E' = \{(\Delta L')^2 + (\Delta a')^2 + (\Delta b')^2\}^{1/2}$$

Hue of formed plate before residing: L'',a'',b''
Hue of formed plate after residing: L''',a''',b'''
$\Delta L'$: L''-L''
$\Delta a'$: a'''-a''
$\Delta b'$: b'''-b''

(4) Evaluation of YI (Yellowness)

Virgin pellets obtained in Examples were used.

Virgin pellets plasticized and melted at 350° C. were injected into a mold set at a temperature of 200° C., and spectacle lens molded products having a diameter of 80 mm, an edge thickness of 9 mm and a lens power of −2.0 were produced by an extrusion compression molding method in which a product was cooled under a pressure of approximately 1,700 psi at a temperature of 23° C. for approximately 10 minutes. The thus-obtained spectacle lens molded products were measured for YI (yellowness) with Color-Eye 7000A supplied by Gretag Macbeth with an illuminant C at a view angle of 2° according to a transmission method.

Example 1

To 100 parts of a polycarbonate resin powder having a viscosity average molecular weight of 23,900 obtained from bisphenol A and phosgene by an interfacial polymerization method were added 0.25 part of a fatty acid ester mold release agent (R-1) described as a mold release agent in Table 1, 0.20 part of 2-(2'-hydroxy-5'-tert-octylphenyl)benzotriazole (UV-1) as an ultraviolet absorbent, 0.10 part of the following hindered phenol antioxidant (A-1), 0.01 part of the following phosphorus heat stabilizer (A-2), 0.02 part of the following phosphorus heat stabilizer (A-3) and 0.6 ppm of a compound of the following formula (B) as a bluing agent, and they were fully mixed with a tumbler. Then, the mixture was pelletized with a 30 mm diameters vented twin-screw extruder at 290° C. (virgin pellets).

Further, for observing a hue change of re-pellets, the virgin pellets were pelletized continuously twice with a 30 mm diameters vented single-screw extruder at 280° C. to obtain re-pellets. These virgin pellets and re-pellets were evaluated according to the above evaluation method. Table 2 shows the evaluation results.

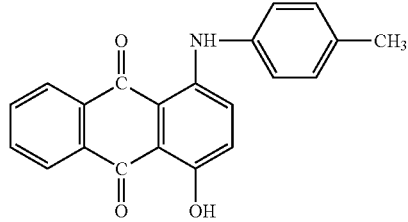

(B)

Examples 2-6 and Comparative Examples 1-4

Procedures similar to those of Example 1 were repeated except that mold release agents shown in Table 1 were used in amounts shown in Table 2. Table 2 shows the evaluation results.

Example 7

To 100 parts of a polycarbonate resin powder having a viscosity average molecular weight of 22,400 obtained from bisphenol A and phosgene by an interfacial polymerization were added 0.25 part of a fatty acid ester mold release agent (R-1) shown in Table 1 as a mold release agent, 0.18 part of 2,2'-methylenebis[4-(1,1,3,3-tetramethyl)-6-(2H-benzotriazol-2-yl)phenol] (UV-2) as an ultraviolet absorbent, 0.10 part of the following hindered phenol antioxidant (A-1), 0.01 part of the following phosphorus heat stabilizer (A-2) and 0.4 ppm of a bluing agent of the above formula (B), and they were fully mixed with a tumbler. Then, the mixture was pelletized with a 30 mm diameters vented twin-screw extruder at 290° C. (virgin pellets).

Further, for observing a hue change of re-pellets, the virgin pellets were pelletized continuously twice with a 30 mm diameters vented single-screw extruder at 280° C. to obtain re-pellets. These virgin pellets and re-pellets were evaluated according to the above evaluation method. Table 2 shows the evaluation results.

Examples 8-12 and Comparative Examples 5-8

Procedures similar to those of Example 1 were repeated except that mold release agents shown in Table 1 were used in amounts shown in Table 2. Table 2 shows the evaluation results.

Symbols in Tables 1 and 2 stand for the following compounds.

(1) Polycarbonate Resin
PC-1: Polycarbonate resin powder having a viscosity average molecular weight of 23,900 obtained from bisphenol A and phosgene by an interfacial polymerization method.
PC-2: Polycarbonate resin powder having a viscosity average molecular weight of 22,400 obtained from bisphenol A and phosgene by an interfacial polymerization.

(2) Fatty Acid Ester Mold Release Agent
The following fatty acid ester mold release agents (R-1, R-2) and mixtures of these having specified weight ratios were used in these Examples. Table 1 shows the mixing ratios.
R-1: A mixture of glycerin tristearate with stearyl stearate (Rikemal SL900A (trade name) supplied by Riken Vitamin Co., Ltd.)
R-2: A mixture of glycerin tristearate with stearyl stearate (Rikemal SL900 (trade name) supplied by Riken Vitamin Co., Ltd.)

(3) Benzotriazole Ultraviolet Absorbent
UV-1: 2-(2' hydroxy-5'-tert-octylphenyl)benzotriazole
UV-2: 2,2'-methylenebis[4-(1,1,3,3-tetramethylbutyl)-6-(2H-benzotriazol-2-yl)phenol (4) Hindered Phenol Antioxidant
A-1: Pentaerythritol-tetrakis(3-(3,5-di-tert-butyl-4-hydroxyphenyl) propionate)

(5) Phosphorus Heat Stabilizer
A-2: Tris(2,4-di-tert-butylphenyl)phosphite
A-3: A mixture of the following components a-1, a-2 and a-3 in an amount ratio of 71:15:14 (weight ratio).
Component a-1: A mixture of tetrakis(2,4-di-tert-butylphenyl)-4,4'-biphenylenediphosphonite, tetrakis(2,4-di-tert-butylphenyl)4,3'-biphenylenediphosphonite and tetrakis(2,4-di-tert-butylphenyl)3,3'-biphenylenediphosphonite in an amount ratio of 100:50:10 (weight ratio).
Component a-2: A mixture of bis(2,4-di-tert-butylphenyl)-4-phenyl-phenylphosphonite and (2,4-di-tert-butylphenyl)-3-phenyl-phenylphosphonite in an amount ratio of 5:3 (weight ratio).
Component a-3: Tirs(2,4-di-tert-butylphenyl) phosphite

TABLE 1

| | Metal ion concentration (ppm) | |
|---|---|---|
| | K (ppm) | Na (ppm) |
| R-1 | 10 | 20 |
| R-2 | 30 | 70 |
| R-3 (R-1:R-2 = 90:10) | 12 | 25 |
| R-4 (R-1:R-2 = 80:20) | 15 | 30 |
| R-5 (R-1:R-2 = 70:30) | 16 | 36 |
| R-6 (R-1:R-2 = 50:50) | 21 | 45 |

TABLE 2

| | PC | Ultraviolet absorbent | | Hindered phenol antioxidant | | Phosphorus heat stabilizer | | Mold release agent | | Reproducibility ΔE | High temperature resistance ΔE' | Yellowness YI |
|---|---|---|---|---|---|---|---|---|---|---|---|---|
| | | kind | amount (pbw) | kind | amount (pbw) | kind | amount (pbw) | kind | amount (pbw) | | | |
| Ex. 1 | PC-1 | UV-1 | 0.20 | A-1 | 0.10 | A-2 | 0.01 | R-1 | 0.25 | 2.4 | 0.3 | 0.4 |
| | | | | | | A-3 | 0.02 | | | | | |
| Ex. 2 | PC-1 | UV-1 | 0.20 | A-1 | 0.15 | A-2 | 0.01 | R-1 | 0.25 | 2.3 | 0.3 | 0.4 |
| | | | | | | A-3 | 0.02 | | | | | |

TABLE 2-continued

| | PC | Ultraviolet absorbent kind | Ultraviolet absorbent amount (pbw) | Hindered phenol antioxidant kind | Hindered phenol antioxidant amount (pbw) | Phosphorus heat stabilizer kind | Phosphorus heat stabilizer amount (pbw) | Mold release agent kind | Mold release agent amount (pbw) | Reproducibility $\Delta E$ | High temperature resistance $\Delta E'$ | Yellowness YI |
|---|---|---|---|---|---|---|---|---|---|---|---|---|
| Ex. 3 | PC-1 | UV-1 | 0.20 | A-1 | 0.20 | A-2 / A-3 | 0.01 / 0.02 | R-1 | 0.25 | 2.4 | 0.2 | 0.4 |
| Ex. 4 | PC-1 | UV-1 | 0.20 | A-1 | 0.10 | A-2 / A-3 | 0.01 / 0.02 | R-1 | 0.05 | 2.2 | 0.2 | 0.4 |
| Ex. 5 | PC-1 | UV-1 | 0.20 | A-1 | 0.10 | A-2 / A-3 | 0.01 / 0.02 | R-3 | 0.25 | 2.5 | 0.3 | 0.4 |
| Ex. 6 | PC-1 | UV-1 | 0.20 | A-1 | 0.10 | A-2 / A-3 | 0.01 / 0.02 | R-4 | 0.25 | 2.5 | 0.3 | 0.5 |
| C. Ex. 1 | PC-1 | UV-1 | 0.20 | A-1 | 0.10 | A-2 / A-3 | 0.01 / 0.02 | R-1 | 0.60 | 7.2 | 2.1 | 11.2 |
| C. Ex. 2 | PC-1 | UV-1 | 0.20 | A-1 | 0.10 | A-2 / A-3 | 0.01 / 0.02 | R-2 | 0.25 | 3.9 | 1.3 | 5.1 |
| C. Ex. 3 | PC-1 | UV-1 | 0.20 | A-1 | 0.10 | A-2 / A-3 | 0.01 / 0.02 | R-5 | 0.25 | 2.9 | 0.6 | 2.5 |
| C. Ex. 4 | PC-1 | UV-1 | 0.20 | A-1 | 0.10 | A-2 / A-3 | 0.01 / 0.02 | R-6 | 0.25 | 3.3 | 0.7 | 3.7 |
| Ex. 7 | PC-2 | UV-2 | 0.18 | A-1 | 0.10 | A-2 | 0.01 | R-1 | 0.25 | 2.4 | 0.3 | 2.5 |
| Ex. 8 | PC-2 | UV-2 | 0.18 | A-1 | 0.15 | A-2 | 0.01 | R-1 | 0.25 | 2.4 | 0.3 | 2.4 |
| Ex. 9 | PC-2 | UV-2 | 0.18 | A-1 | 0.20 | A-2 | 0.01 | R-1 | 0.25 | 2.4 | 0.3 | 2.5 |
| Ex. 10 | PC-2 | UV-2 | 0.18 | A-1 | 0.10 | A-2 | 0.01 | R-1 | 0.05 | 2.3 | 0.2 | 2.7 |
| Ex. 11 | PC-2 | UV-2 | 0.18 | A-1 | 0.10 | A-2 | 0.01 | R-3 | 0.25 | 2.5 | 0.3 | 2.7 |
| Ex. 12 | PC-2 | UV-2 | 0.18 | A-1 | 0.10 | A-2 | 0.01 | R-4 | 0.25 | 2.5 | 0.3 | 2.7 |
| C. Ex. 5 | PC-2 | UV-2 | 0.18 | A-1 | 0.10 | A-2 | 0.01 | R-1 | 0.60 | 8.4 | 1.4 | 12.9 |
| C. Ex. 6 | PC-2 | UV-2 | 0.18 | A-1 | 0.10 | A-2 | 0.01 | R-2 | 0.25 | 4.1 | 1.1 | 7.2 |
| C. Ex. 7 | PC-2 | UV-2 | 0.18 | A-1 | 0.10 | A-2 | 0.01 | R-5 | 0.25 | 3.0 | 0.5 | 4.8 |
| C. Ex. 8 | PC-2 | UV-2 | 0.18 | A-1 | 0.10 | A-2 | 0.01 | R-6 | 0.25 | 3.4 | 0.6 | 6.0 |

Ex.: Example,
C. Ex.: Comparative Example,
pbw: part by weight

Examples 13-14 and Comparative Example 9

The virgin pellets obtained in the above Example 1, Example 7 or Comparative Example 5 were molded into spectacle lenses having a diameter of 70 mm, an edge thickness of 3 mm and a lens power of −1.2 each with a molding machine NISSEI ES4000. With regard to molding conditions, the virgin pellets plasticized and melted at 310° C. were injected into a mold set at a temperature of 130° C. and injection press-molded at a press stroke of 3.2 mm. The molding was carried out for a cycle time period of 240 seconds. The mold used was capable of making 6 spectacle lens molded products by one cycle of injection press.

The thus-obtained spectacle lenses were pulverized, and 20 parts by weight of the pulverized lens material was added to 80 parts by weight of the virgin pellets obtained in Example 1, Example 7 or Comparative Example 5. The resultant mixture was injection press-molded under the same conditions.

The spectacle lens molded products obtained from the virgin pellets and the spectacle lens molded products obtained from the mixture were measured for YI (yellowness), and Table 3 shows the results. The yellowness was measured with Color-Eye 7000A supplied by Gretag Macbeth with an illuminant C at a view angle of 2° according to a transmission method.

TABLE 3

| | Yellowness YI | |
|---|---|---|
| | Without pulverized material | Pulverized material contained |
| Example 13 | 0.6 | 0.7 |
| Example 14 | 0.6 | 0.8 |
| Comparative Example 9 | 1.6 | 2.9 |

EFFECT OF THE INVENTION

The resin composition used in this invention is excellent in molding-heat resistance and is less susceptible to yellowing even when exposed to a high-temperature state for a long period of time during its lens molding. The spectacle lens of this invention is therefore excellent in hue. The resin composition used in this invention is excellent in reproducibility, and is less susceptible to a change in hue even when a thermal history is added by reclaiming a product scrap, etc. Therefore, the spectacle lens of this invention containing a reclaimed material such as a product scrap is excellent in hue. The spectacle lens of this invention is excellent in impact resistance, transparency and ultraviolet-blocking capability.

According to the production process of this invention, spectacle lenses excellent in hue can be obtained. According to the production process of this invention, further, spectacle lenses excellent in hue can be obtained even if a product scrap, etc., are reclaimed.

INDUSTRIAL APPLICABILITY

The spectacle lens of this invention is used as/for an eyesight-correcting lens, dark glasses, protective glasses, etc.

The invention claimed is:

1. A spectacle lens formed from a resin composition containing
   (1) 100 parts by weight of a polycarbonate resin,
   (2) 0.05 to 0.5 part by weight of a fatty acid ester mold release agent that is a mixture of
      (i) an ester of a monohydric alcohol having 1 to 20 carbon atoms and a saturated fatty acid having 10 to 30 carbon atoms with
      (ii) a full ester of glycerin and a saturated fatty acid having 10 to 30 carbon atoms, and that has a metal potassium content of 15 ppm or less and a metal sodium content of 30 ppm or less,
   (3) 0.1 to 0.25 part by weight of a benzotriazole ultraviolet absorbent,
   (4) 0.1 to 0.3 part by weight of a hindered phenol antioxidant, and
   (5) 0.005 to 0.1 part by weight of a phosphorus heat stabilizer.

2. The spectacle lens of claim 1, wherein the fatty acid ester mold release agent is a mixture of glycerin tristearate with stearyl stearate.

3. The spectacle lens of claim 1, wherein the benzotriazole ultraviolet absorbent is 2-(2'-hydroxy-5'-tert-octylphenyl)benzotriazole.

4. The spectacle lens of claim 1, wherein the benzotriazole ultraviolet absorbent is 2,2'-methylenebis[4-(1,1,3,3-tetramethylbutyl)-6-(2H-benzotriazol-2-yl)phenol].

5. The spectacle lens of claim 1, wherein the hindered phenol antioxidant is a hindered phenol antioxidant having a pentaerythritol structure.

6. The spectacle lens of claim 1, wherein the phosphorus heat stabilizer has 2,4-di-tert-butylphenyl structure.

7. The spectacle lens of claim 1, wherein pellets of the polycarbonate resin composition have a color difference ($\Delta E$) of 2.5 or less, the pellets being obtained by molding said polycarbonate resin composition with a twin-screw extruder to obtain pellets and extrusion-remolding the pellets again with a single-screw extruder, $$\Delta E = \{(\Delta L)^2 + (\Delta a)^2 + (\Delta b)^2\}^{1/2}$$

Hue of pellets (virgin pellets) obtained by molding with the twin-screw extruder: L,a,b
Hue of pellets (re-pellets) obtained by remolding with the single-screw extruder: L',a',b'
$\Delta L$: L-L'
$\Delta a$: a-a'
$\Delta b$: b-b'.

8. A process for producing a spectacle lens, which comprises molding a resin composition containing
   (1) 100 parts by weight of a polycarbonate resin,
   (2) 0.05 to 0.5 part by weight of a fatty acid ester mold release agent that is a mixture of
      (i) an ester of a monohydric alcohol having 1 to 20 carbon atoms and a saturated fatty acid having 10 to 30 carbon atoms with
      (ii) a full ester of glycerin and a saturated fatty acid having 10 to 30 carbon atoms, and that has a metal potassium content of 15 ppm or less and a metal sodium content of 30 ppm or less,
   (3) 0.1 to 0.25 part by weight of a benzotriazole ultraviolet absorbent,
   (4) 0.1 to 0.3 part by weight of a hindered phenol antioxidant, and
   (5) 0.005 to 0.1 part by weight of a phosphorus heat stabilizer.

* * * * *